United States Patent [19]

Taguchi et al.

[11] Patent Number: 5,140,060
[45] Date of Patent: Aug. 18, 1992

[54] ELECTROLUMINESCENCE DEVICE

[75] Inventors: Yoshihiro Taguchi; Shunetu Sato, both of Miyagi, Japan

[73] Assignee: Alps Electric Co., Ltd., Tokyo, Japan

[21] Appl. No.: 658,924

[22] Filed: Feb. 21, 1991

[30] Foreign Application Priority Data

Feb. 22, 1990 [JP] Japan .................. 2-41994

[51] Int. Cl.$^5$ .................. C08K 5/16; C08K 3/30; C09K 11/08; C09K 11/02
[52] U.S. Cl. .................. 524/555; 252/301.33; 252/301.35; 524/420
[58] Field of Search .................. 524/555, 420; 252/301.33, 301.35

[56] References Cited

U.S. PATENT DOCUMENTS 4,708,914 11/1987 Kamijo .................. 428/690

FOREIGN PATENT DOCUMENTS 2566791 1/1986 France .................. 252/301.35
2305815 12/1990 Japan .................. 252/301.35

Primary Examiner—Paul R. Michl
Assistant Examiner—Peter Szekely
Attorney, Agent, or Firm—Guy W. Shoup; B. Noel Kivlin

[57] ABSTRACT

An electroluminescence device comprises a matrix polymer that is a polymer obtained by polymerizing electron-accepting monomers having electron-accepting groups. The electron-accepting groups are cyanoalkyl groups and/or cyanoalkyl-oxyalkyl groups.

5 Claims, 1 Drawing Sheet

ELECTROLUMINESCENCE DEVICE

BACKGROUND OF THE INVENTION

1) Field of the Invention

The present invention relates to an organic dispersion-type electroluminescence device (hereinafter called "EL device"), and particularly to an EL device capable of providing a long life.

2) Description of the Related Art

In conventional organic dispersion-type EL devices, those formed by dispersing fluorescent powder such as ZnS(Cu) into a polymer matrix have been used as a luminescent layer. The polymer matrix, uses a high dielectric constant polymer, such as cyanoethylated cellulose, cyanoethylated poly(vinyl alcohol), etc.

However, the polymer such as the above 2-cyanoethylated poly(vinyl alcohol) is produced by a method in which acrylonitrile is allowed to react with poly(vinyl alcohol) in the form of a Michel-type addition reaction under the presence of a basic catalyst and introducing 2-cyanoethyl groups into hydroxyl groups of poly(vinyl alcohol). Therefore, the hydroxyl groups of 10% or so are left in its repeating structure without being subjected to substitution, thereby increasing hygroscopicity due to the remaining of the hydroxyl groups.

Thus, such a luminescent layer as referred to above also has high hygroscopic capability, and the fluorescent powder in the luminescent layer is decomposed by hygroscopic water content depending upon variations with time, thus causing inconvenience such as a limitation on the luminescent life of each EL device.

SUMMARY OF THE INVENTION

With the foregoing drawbacks in view, it is an object of the present invention to provide an electroluminescence device having a luminescent layer formed by dispersing fluorescent powder into a matrix polymer, the electroluminescence device being characterized in that the matrix polymer is a polymer obtained by polymerizing electron-accepting monomers having electron-accepting groups.

The above-described polymer has side chains all of which are composed of hydrophobic electron-accepting groups such as cyanoethyl groups. In addition, the polymer has also high dielectric constant and low hygroscopic capability. Thus, the hygroscopicity of the luminescent layer of the type that the polymer or a blend polymer including the polymer is used as a matrix is also improved, thereby making it possible to provide an EL device which can make its luminescent life long.

As described above, since the EL device according to the present invention is used with the polymer obtained by polymerizing the electron-accepting monomers having the hydrophobic electron-accepting groups or with the blend polymer including the polymer as the polymer matrix which forms the luminescent layer of the EL device, the hygroscopic capability of the polymer or the blend polymer becomes low and that of the luminescent layer also becomes extremely low, thus bringing about an advantageous effect that the luminescent life of the EL device becomes long. In addition, the dielectric constant of the polymer can be rendered high, and a reduction in drive voltages and an improvement in operational stability can be carried out.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

A preferred embodiment of the present invention will hereinafter be described with the accompanying drawings.

A description will first be made of a polymer which forms a luminescent layer of an EL device according to the present invention.

The polymer employed in the present invention is a polymer obtained by polymerizing electron-accepting monomers having hydrophobic electron-accepting groups. As specific examples, may be mentioned an acrylate monomer and a metacrylate monomer represented in accordance with Formulas (1) and (2), etc.

$$CH_2=CHCOOX \qquad (1)$$

$$CH_2=C(CH_3)COOX \qquad (2)$$

Functional groups X represented in the Formulas (1) and (2) are hydrophobic electron-accepting groups, such as the following:

$-CH_2CN$ $-CH_2CH_2CN$ $-CH(CH_3)CN$ $-CH_2CH_2OCH_2CH_2CN$

Since side chains of the above-described polymer are all represented in the form of hydrophobic electron-accepting groups in the above-described polymer, hydrophilic groups such as hydroxyl groups no longer exist in molecules, thereby resulting in a reduction in water absorption properties. Since the electron-accepting groups exist in the molecules in large numbers, the dielectric constant of the polymer is high.

A description will now be made of the EL device used with the above polymer which is regarded as a matrix of a luminescent layer or a dielectric layer.

Figure 1:
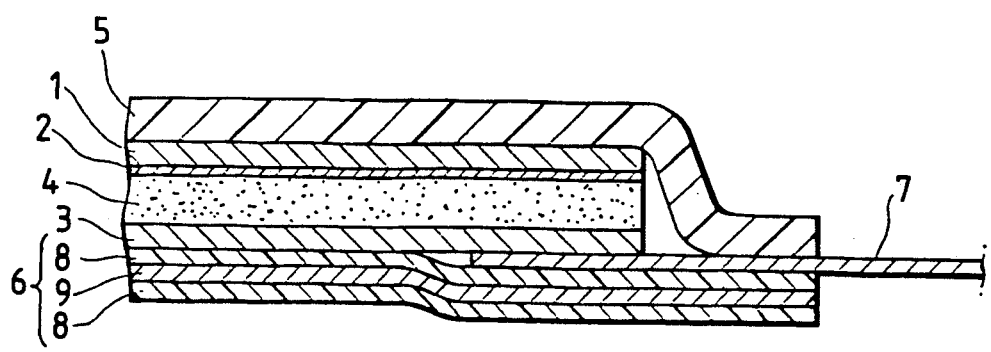
FIG. 1 is a schematic view showing an EL device according to one embodiment of the present invention.

FIG. 1 shows the EL device according to one embodiment of the present invention. A luminescent layer 4 formed by dispersing fluorescent powder into a polymer matrix is interposed in a laminated form between a transparent electrode 2 formed on one of both surfaces of a transparent sheet 1 and an opposed electrode 3 composed of a metal foil such as aluminum. The laminate thus formed is interposed between a pair of protective sheets 5, 6 and sealed by tightly joining a peripheral edge portion of the protective sheet 5 to that of the protective sheet 6 with a heat seal used with a hot-melt adhesive, or the like. A lead-wire terminal 7 is electrically connected to an end of the opposed electrode 3 through a conductive adhesive, whereas an unillustrated lead-wire terminal is electrically connected to an end of the transparent electrode 2 through the conductive adhesive. The luminescent layer 4 is emitted by applying the voltage across the two electrodes 2 and 3 through the lead-wire terminals from the outside. As the pair of protective sheets 5, 6, materials having superb water-barrier properties may be used. They are designed to prevent water from permeating the luminescent layer 4 provided internally of the protective sheets 5, 6 to the utmost. As the protective sheet 5 on the side of the transparent electrode 2, a resin film may be used, for example, such as a transparent polytrifluorochloroethylene and a polyethylene having superb water-barrier properties. On the other hand, as the protective sheet 6 on the side of the opposed electrode 3, a metallic composite film may be used having an extremely-high water-barrier property, which is made by inserting a metal such as aluminum between the resin films 8 and 8 such as a polyethylene terephthalate so as to be formed in a laminated manner.

The luminescent layer 4 of the EL device is used with the above-described polymer as a matrix. Specifically, the luminescent layer 4 is produced in the following manner. Namely, fluorescent powder such as ZnS(Cu), ZnS(Mn), ZnS(Al), etc. is added to the above polymer, and inorganic filler such as fine silica powder (Aerosil) is added to the same as needed. Further, they are mixed together in an organic solvent such as γ-butyrolactone so as to obtain a dispersed liquid composition. The thus-obtained composition is coated or applied on the transparent electrode 2 by the screen printing process or the like, followed by drying, thereby obtaining the luminescent layer 4. The luminescent layer 4 is normally on the order of 10 μm to 100 μm in thickness. The fluorescent powder in the luminescent layer 4 is contained in an amount of from about 70 to 90 wt. %, and the polymer is contained in an amount of from about 10 to 30 wt %.

In the EL device described above, the polymer matrix, which forms the luminescent layer 4 of the EL device, is a polymer having the extremely-low hygroscopic capability as described above. Therefore, the hygroscopic capability of the luminescent layer 4 becomes extremely low, and hence decomposition of the fluorescent powder by water is restricted, thereby making it possible to make the luminescent life of the EL device significantly long.

Since its dielectric constant is also high as described above, the drive voltage can be reduced and the operation of the EL device can be kept stable.

As a modification of the EL device, there is provided one of the type in which the luminescent layer 4 is composed of two layers, i.e., a layer of a fluorescent substance and a layer of a dielectric. In this case, the fluorescent layer is formed as follows. Namely, the fluorescent powder and the polymer are mixed together in the organic solvent to obtain the dispersed liquid composition, and the so-obtained composition is applied on the transparent electrode 2 in the same manner as described above, followed by drying, thereby forming the layer. On the other hand, the dielectric layer is formed in the following manner. Namely, one obtained by dissolving the polymer in the organic solvent or the liquid composition obtained by adding inorganic dielectric powder such as barium titanate powder to the polymer as needed is applied on the fluorescent layer and then dried, thereby forming the dielectric layer. An increase in the stable operation of the EL device constructed in this way is further secured.

Incidentally, the application of the above polymer to both of the fluorescent layer and the dielectric layer or to either one of them can be selected arbitrarily.

EXAMPLES

Specific examples will hereinafter be described.

(A) Polymerization of Polymer 1

An air inside a two-way type flask provided with a jacket-type cooler is replaced with nitrogen. Then, 0.4 mol of 2-cyanoethylacrylate, 20 ml. of acetone and 2-2'-azobisisobutyronitrile (2 mol % with respect to the total weight of monomers), all of which are purified, are introduced into the inside thereof, followed by polymerization at 60° C. for 24 Hrs. Thereafter, the polymer is allowed to be reprecipitated in methanol so as to obtain an intended polycyanoethylacrylate.

(B) Polymerization of Polymer 2

Using $CH_2=CHCOOCH_2CH_2CH_2CN$ as an alternative to the use of the 2-cyanoethylacrylate, the polymer is obtained in the same manner as the polymerization process of the above polymer 1.

(C) Polymerization of Polymer 3

Using cyanoethylmetacrylate as an alternative to the cyanoethylacrylate, polycyanoethylmetacrylate is obtained in the same manner as the polymerization process of the above polymer 1.

The dielectric constant (25° C., 1 KHz), the hygroscopicity and the amount of residual water of each of the polymers 1 to 3 thus obtained have been examined.

The evaluation of the hygroscopicity is performed in the following manner. An acetone solution of the polymer is applied on a suitable carrier by the cast film process so as to produce a film of 0.1 mm in thickness. The thus-produced film is dried in vacuo at 100° C. for 24 Hrs. After drying, the amount of water in the film is measured by the Karl Fischer method, thereby determining the result as the amount of residual water. In the polymer, the film is left over 24 Hrs under conditions that temperature is 40° C. and RH is 90-95%, after which the amount of water included in the film is measured. The term vol % with respect to the weight of the film is set as a value indicative of the hygroscopicity.

The result of the above examination will be shown in Table 1. Values obtained by examining the conventional cyanoethylated poly(vinyl alcohol) in the same manner are described in Table 1 as compared values together with values of the above result. Incidentally, the percentage of cyanoethylation for the cyanoethylated poly(vinyl alcohol) was about 90%.

Figure 2:
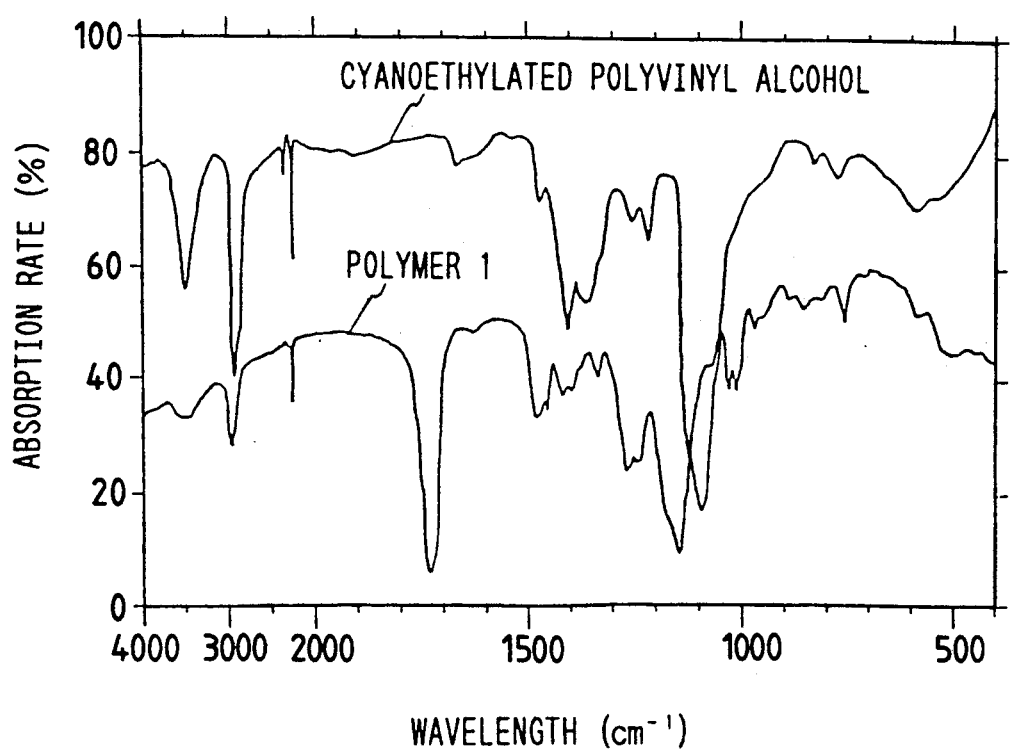
FIG. 2 is a diagram for describing infrared absorption spectrums of a polymer 1 and cyanoethylated poly(vinyl alcohol).

FIG. 2 is a diagram for describing infrared absorption spectrums of both the polymer 1 and the cyanoethylated poly(vinyl alcohol). It is understood from the drawing that the polymer 1 has a reduced absorption peak in the neighborhood of 3300 $cm^{-1}$, which is caused by the water or a hydroxyl group (OH), as compared with the cyanoethylated poly(vinyl alcohol), thus resulting in low water-absorption properties.

TABLE 1

|  | Dielectric constant | Amount of residual water (wt %) | Hygroscopicity (wt %) |
| --- | --- | --- | --- |
| Polymer 1 | 19 | 0.047–0.078 | 2.3–2.4 |
| Polymer 2 | 21 | 0.043–0.08 | 2.5–2.9 |
| Polymer 3 | 10.5 | 0.025–0.042 | 1.4–1.9 |
| Cyano- | 14 | 0.1–0.21 | 5.5–9.2 |

TABLE 1-continued

| | Dielectric constant | Amount of residual water (wt %) | Hygroscopicity (wt %) |
|---|---|---|---|
| ethylated poly(vinyl alcohol) | | | |

A description will next be made of Examples of EL devices used with the polymers described above.

EXAMPLE 1

The polymer 1 is used to form a luminescent layer, thereby producing an EL device from the so-formed luminescent layer. $ZnS(Cu)_2$ is used as fluorescent powder. Then, the polymer 1 (40 g) is dissolved in 60 g of γ-butyrolactone. Thereafter, 100 g of a dispersed solution obtained by this dissolution and 41 g of a dispersed solution obtained by dispersing 1 g of an aerosil into 40 g of the γ-butyrolactone are mixed together and dispersed in a uniform manner, thereby obtaining a liquid composition. The liquid composition is applied on a transparent electrode of a transparent sheet, followed by drying, thereby forming a fluorescent layer having a thickness of about 30 μm.

Then, the polymer 1 (40 g) is dissolved in 60 g of the γ-butyrolactone. 100 g of a dispersed solution obtained by this dissolution and a dispersed solution obtained by dispersing 1 g of the aerosil into 40 g of the γ-butyrolactone are mixed together and dispersed in a uniform manner, to thereby obtain a liquid composition. The thus-obtained liquid composition is applied on the fluorescent layer, followed by drying, thereby forming a dielectric layer having a thickness of about 50 μm.

Further, an opposed electrode made of an aluminum foil is formed on the so-formed dielectric layer so as to obtain laminates. The laminates are covered and sealed by a pair of protective sheets of a polyethylene film and a polyethylene terephthalate/aluminum composite film so as to produce an EL device 1.

EXAMPLE 2

An EL device 2 is produced in the same manner as in Example 1 except for the use of the polymer 2 employed instead of the polymer 1.

EXAMPLE 3

An EL device 3 is fabricated in the same manner as in Example 1 except for the use of the polymer 3 employed instead of the polymer 1.

EXAMPLE 4

An EL device 4 is produced by using a blend polymer composed of both 65 parts by weight of cyanoethylated pluran (percentage of cyanoethylation is about 90%) and the polymer 1 (35 parts by weight) instead of the polymer 1 in the same manner as in Example 1. The dielectric constant of the blend polymer was a range from 17.2 to 18, the amount of residual water was a range from 0.55 to 0.95 wt %, and the water-absorption property thereof was a range from 2.7 to 4.2 wt %.

COMPARATIVE EXAMPLE

An EL device is fabricated in the same manner as in Example 1 with the exception of the use of the blend polymer composed of 65 parts by weight of the conventional cyanoethylated cellulose (percentage of cyanoethylation is about 90%) and 35 parts by weight of cyanoethylated poly(vinyl alcohol) (percentage of cyanoethylation is about 90%), as an object to be compared. Incidentally, the dielectric constant of the blend polymer was a range of 14.1 to 16.5, the amount of the residual water was a range of 0.55 to 0.95 wt %, and the water-absorption property was a range of 5.2 to 5.5 wt %.

The luminescent life of each of the five kinds of EL devices produced in the above-described manner was measured by applying a 100 volts, 400 Hz a.c. power supply across electrodes and continuously emitting them under the conditions that a testing temperature is 20° C. and RH is 60%. The luminescent life is represented by the half-life period required for the initial luminance to be reduced to one-half its initial value.

Table 2 shows the initial luminance and the luminescent life.

TABLE 2

| | Luminescent Life (Hours) | Initial Luminance (cd/m$^2$) |
|---|---|---|
| Example 1 (EL device 1) | 3600 | 49.2 |
| Example 2 (EL device 2) | 3300 | 55.4 |
| Example 3 (EL device 3) | 4200 | 41.5 |
| Example 4 (EL device 4) | 3500 | 53.2 |
| Comparative Example (Conventional Example) | 2700 | 49.5 |

It is clearly understood from Table 2 that the EL device of the present invention using the polymer can extend the luminous life-time thereof significantly because the hygroscopic capability of the polymer is low. In addition, it is clear that the blend polymer composed of the above polymer and a crystalline polymer such as cyanoethylated cellulose, cyanoethylated pluran, etc. also exhibit a long-lived effect.

Having now fully described the invention, it will be apparent to those skilled in the art that many changes and modifications can be made without departing from the spirit or scope of the invention as set forth herein.

What is claimed is:

1. An electroluminescence device comprising:
    a luminescent layer formed by dispersing fluorescent powder into a matrix polymer, wherein said matrix polymer contains a polymer obtained by polymerizing electron-accepting monomers having hydrophobic electron-accepting groups.

2. The electroluminescence device as claimed in claim 1, wherein said hydrophobic electron-accepting groups are cyanoalkyl groups.

3. The electroluminescence device as claimed in claim 1, wherein said hydrophobic electron-accepting groups are cyanoalkyl-oxyalkyl groups.

4. The electroluminescence device as claimed in claim 1, wherein said electron-accepting monomers having said hydrophobic electron-accepting groups are acrylate monomers having cyanoalkyl groups.

5. The electroluminescence device as claimed in claim 1, wherein said electron-accepting monomers having said hydrophobic electron-accepting groups are acrylate monomers having cyanoalkyl-oxyalkyl groups.

* * * * *